United States Patent
Bandhole et al.

(10) Patent No.: US 7,702,892 B1
(45) Date of Patent: *Apr. 20, 2010

(54) SYSTEM TO PROVIDE COMPUTING AS A PRODUCT USING DYNAMIC COMPUTING ENVIRONMENTS

(75) Inventors: Jagadish Bandhole, San Jose, CA (US); Sekaran Nanja, San Jose, CA (US); Shan Balasubramaniam, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 584 days.

This patent is subject to a terminal disclaimer.

(21) Appl. No.: 11/243,129

(22) Filed: Oct. 4, 2005

Related U.S. Application Data (63) Continuation of application No. 10/066,324, filed on Jan. 30, 2002, now Pat. No. 7,036,006, which is a continuation-in-part of application No. 09/861,483, filed on May 17, 2001, now Pat. No. 7,278,142.

(51) Int. Cl.
*G06F 9/46* (2006.01)
(52) U.S. Cl. .................. 713/1; 718/1; 718/104
(58) Field of Classification Search ............ 713/1; 705/52; 709/217–225; 718/1, 104
See application file for complete search history.

(56) References Cited

U.S. PATENT DOCUMENTS

| | | | |
|---|---|---|---|
| 4,925,311 A | 5/1990 | Neches et al. | 364/200 |
| 5,191,611 A * | 3/1993 | Lang | 705/53 |
| 5,394,522 A | 2/1995 | Sanchez-Frank et al. | 395/159 |
| 5,410,707 A | 4/1995 | Bell | 713/2 |
| 5,418,918 A | 5/1995 | Vander Kamp et al. | 713/2 |
| 5,452,454 A | 9/1995 | Basu | 713/2 |
| 5,463,766 A | 10/1995 | Schieve et al. | 713/2 |
| 5,479,599 A | 12/1995 | Rockwell et al. | 715/837 |

(Continued)

FOREIGN PATENT DOCUMENTS

EP 745929 A1 12/1996

(Continued)

OTHER PUBLICATIONS

Sekaran Nanja, "User Interface for Dynamic Computing Environment Using Allocatable Resources," Filed Sep. 15, 2000, U.S. Appl. No. 09/663,252, 27 pages of specification (including claims and abstract), and 5 sheets of drawings.

(Continued)

*Primary Examiner*—Thuan N Du
(74) *Attorney, Agent, or Firm*—Campbell Stephenson LLP (57) ABSTRACT

A system enabling computing to be provided as a packaged product or as a remote resource to users. Computing is delivered as a product or a resource by providing dynamic computing environments to users based on users' choices of virtual components (hardware, software or network components). A customer can choose the components and configure a computing environment. The system packages this environment and makes it available for users to compute. A service provider can use the system to create computing environments, automatically, on demand and thus providing computing as a remote resource to customers. The system monitors the usage of the customers and they are billed accordingly. In either case users can carry out their computing activity remotely using a client device such as a web browser.

24 Claims, 6 Drawing Sheets

U.S. PATENT DOCUMENTS

| | | | | |
|---|---|---|---|---|
| 5,515,524 | A | 5/1996 | Lynch et al. | 395/500 |
| 5,555,370 | A | 9/1996 | Li et al. | 395/161 |
| 5,577,210 | A | 11/1996 | Abdous et al. | 709/219 |
| 5,668,995 | A | 9/1997 | Bhat | 395/674 |
| 5,694,600 | A | 12/1997 | Khenson et al. | 713/2 |
| 5,727,213 | A | 3/1998 | Vander Kamp et al. | 713/2 |
| 5,842,011 | A | 11/1998 | Basu | 713/2 |
| 5,894,571 | A | 4/1999 | O'Connor | 395/652 |
| 5,942,738 | A | 8/1999 | Cesaire et al. | 235/380 |
| 5,948,101 | A | 9/1999 | David et al. | 713/2 |
| 5,974,547 | A | 10/1999 | Klimenko | 713/2 |
| 6,009,507 | A | 12/1999 | Brooks et al. | 712/28 |
| 6,058,113 | A | 5/2000 | Chang | 370/390 |
| 6,081,846 | A | 6/2000 | Hyder et al. | 709/250 |
| 6,081,864 | A | 6/2000 | Lowe et al. | 710/129 |
| 6,085,318 | A | 7/2000 | Vander Kamp et al. | 713/1 |
| 6,092,189 | A | 7/2000 | Fisher et al. | 713/1 |
| 6,098,067 | A | 8/2000 | Erickson | 707/10 |
| 6,101,601 | A | 8/2000 | Matthews et al. | 713/2 |
| 6,182,123 | B1 | 1/2001 | Filepp et al. | 709/217 |
| 6,182,275 | B1 | 1/2001 | Beelitz et al. | 717/175 |
| 6,189,100 | B1 | 2/2001 | Barr et al. | 713/182 |
| 6,202,091 | B1 | 3/2001 | Godse | 709/222 |
| 6,230,200 | B1 | 5/2001 | Forecast et al. | 709/226 |
| 6,259,448 | B1 | 7/2001 | McNally et al. | 345/348 |
| 6,262,726 | B1 | 7/2001 | Stedman et al. | 345/333 |
| 6,298,443 | B1 | 10/2001 | Colligan et al. | 713/200 |
| 6,304,965 | B1 | 10/2001 | Rickey | 713/2 |
| 6,308,238 | B1 | 10/2001 | Smith et al. | 710/310 |
| 6,370,560 | B1 | 4/2002 | Robertazzi et al. | 718/105 |
| 6,374,336 | B1 | 4/2002 | Peters et al. | 711/167 |
| 6,393,557 | B1 | 5/2002 | Guthridge et al. | 713/1 |
| 6,421,777 | B1 | 7/2002 | Pierre-Louis et al. | 713/2 |
| 6,446,126 | B1 | 9/2002 | Huang et al. | 709/226 |
| 6,463,530 | B1 | 10/2002 | Sposato | 713/2 |
| 6,466,972 | B1 | 10/2002 | Paul et al. | 709/222 |
| 6,466,978 | B1 | 10/2002 | Mukherjee et al. | 709/216 |
| 6,477,624 | B1 | 11/2002 | Kedem et al. | 711/147 |
| 6,493,679 | B1 | 12/2002 | Rappaport et al. | 705/29 |
| 6,498,791 | B2 | 12/2002 | Pickett et al. | 370/353 |
| 6,512,526 | B1 | 1/2003 | McGlothlin et al. | 345/762 |
| 6,539,456 | B2 | 3/2003 | Stewart | 711/113 |
| 6,543,047 | B1 | 4/2003 | Vrhel, Jr. et al. | 717/121 |
| 6,550,006 | B1 | 4/2003 | Khanna | 713/2 |
| 6,560,606 | B1 | 5/2003 | Young | 707/100 |
| 6,564,112 | B1 | 5/2003 | Factor | 700/97 |
| 6,577,229 | B1 | 6/2003 | Bonneau et al. | 340/10.41 |
| 6,578,141 | B2 | 6/2003 | Kelley et al. | 713/1 |
| 6,598,131 | B2 | 7/2003 | Kedem et al. | 711/147 |
| 6,601,166 | B1 | 7/2003 | Ayyar et al. | 713/2 |
| 6,615,365 | B1 | 9/2003 | Jenevein et al. | 714/6 |
| 6,633,916 | B2 | 10/2003 | Kauffman | 709/229 |
| 6,662,267 | B2 | 12/2003 | Stewart | 711/113 |
| 6,684,327 | B1 | 1/2004 | Anand et al. | 713/2 |
| 6,711,688 | B1 | 3/2004 | Hubacher et al. | 713/201 |
| 6,748,525 | B1 | 6/2004 | Hubacher et al. | 713/1 |
| 6,757,837 | B1 | 6/2004 | Platt et al. | 714/4 |
| 6,802,062 | B1 | 10/2004 | Oyamada et al. | 718/1 |
| 6,804,774 | B1 | 10/2004 | Larvoire et al. | 713/2 |
| 6,810,478 | B1 | 10/2004 | Anand et al. | 713/2 |
| 7,065,637 | B1 | 6/2006 | Nanja | 713/1 |
| 7,082,521 | B1 | 7/2006 | Nanja | 713/1 |
| 2001/0011304 | A1* | 8/2001 | Wesinger et al. | 709/227 |
| 2002/0069369 | A1* | 6/2002 | Tremain | 713/201 |
| 2003/0046529 | A1 | 3/2003 | Loison et al. | 713/2 |

FOREIGN PATENT DOCUMENTS

EP 841616 A2 5/1998

OTHER PUBLICATIONS

Sekaran Nanja, "System for Configuration of Dynamic Computing Environments Using a Visual Interface," Filed Sep. 15, 2000, U.S. Appl. No. 09/662,990, 23 pages of specification (including claims and abstract), and 2 sheets of drawings.

Simon—"Computer System Built to Order"—Nov. 25, 1996—Newsgroups: demon.adverts, midlands.adverts, sanet.adverts, solent.forsale, uk.adverts.computer, unet.adverts, uk.adverts.other, dungeon.forsale.

Debenham, Clive, "Taos: The Operating System," May 29, 1995, Tantric Technologies, Newsgroups: comp.parallel.

Application Developer's Training Course, SNAP 8.0 Training Participant Guide, Module 7, Copyright © 1997, Template Software, Inc., pp. 7-1 through 7-34.

Workflow Template, Developing a WFT Workflow System, Copyright © 1998, Template Software, Inc.

Workflow Template, Using the WFT Development Environment, Copyright © 1998, Template Software, Inc.

Web Component, Using the Web Component, Copyright © 1997, Template Software, Inc.

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.

Henry, Mike, Intel Corporation, *Extending PXE to Mobile Platforms*, Jun. 1998, pp. 1-4, http://www.intel.com/update/archive/psn/psn06985.pdf.

International Search Report as mailed from the PCT on Aug. 13, 2004 for WO Application (PCT/US03/28820; Filed Sep. 10, 2003), 3 pages).

* cited by examiner

* Optional steps.

SYSTEM TO PROVIDE COMPUTING AS A PRODUCT USING DYNAMIC COMPUTING ENVIRONMENTS

CROSS-REFERENCES TO RELATED APPLICATIONS

This application is a continuation of U.S. patent application Ser. No. 10/066,324, entitled "System To Provide Computing As A Product Using Dynamic Computing Environments," filed Jan. 30, 2002, and naming Jagadish Bandhole, Sekaran Nanja, and Shan Balasubramaniam as inventors, which issued as U.S. Pat. No. 7,036,006 on Apr. 25, 2006, which is a Continuation-in-Part application of U.S. patent application Ser. No. 09/861,483 (which issued as U.S. Pat. No. 7,278,142 on Oct. 2, 2007). This application is also related to U.S. patent application Ser. Nos. 09/663,252 (which issued as U.S. Pat. No. 7,082,521 on Jul. 25, 2006) and 09/662,990 (which issued as U.S. Pat. No. 7,065,637 on Jun. 20, 2006), respectively entitled "User Interface for Dynamic Computing Environment Using Allocable Resources," and "System for Configuration of Dynamic Computing Environment Using a Visual Interface," filed Sep. 15, 2000. All of the aforementioned applications and their disclosures are incorporated herein by reference for all purposes.

BACKGROUND OF THE INVENTION

The present invention relates in general to information processing, and more specifically to a system that facilitates dynamic allocation and de-allocation of computing resources to provide a number of virtual computing platforms as a computing product.

Today, computers are increasingly being used in almost every area of commerce, education, entertainment and productivity. With the growing popularity of the Internet, corporate and campus intranets, home networking and other networks, the trend is to use multiple computers, or processing platforms, to perform tasks and provide services. Thus, the use of computers and computing devices have become commonplace in day-to-day activities of large numbers of users from different walks of life, including those with little to no knowledge of how the portability of computer applications depends on specific computing platforms.

A "platform," includes the underlying hardware or software (e.g., operating system, applications, utilities, and other processes) of a computer system. The platform defines a standard around which a computing system can be developed. Once the platform has been defined, software developers can produce appropriate software and users (e.g., consumers) can purchase appropriate hardware and software applications for the platform. Any number, type and combination of hardware and software can comprise a platform, or environment.

For instance, a platform configured to provide a search service on the Web might include a Linux server running Apache web server software, a Solaris server running a custom application server software and Oracle database software, a 100 Mbps Ethernet LAN connecting the servers, and the Internet.

"Computing" in connection with the platform refers to the activity by one or more users interacting with a computing environment, or platform, that includes a combination of hardware, software, and network resources. Such interaction by a user may be in the form of using the environment to accomplish a task using, for example, application software operably compatible with the environment. For instance, the user may interact with a platform to edit a document, send an email, execute a search using a search engine service, or any equivalent application generally known in the art. Computing also includes programming or configuring the computing environment itself to modify the operability of the computing environment.

In traditional models of computing, users acquire the components of the environment, configure them as needed, and maintain them through a period of use. A disadvantage of the traditional models of computing require the users to purchase or lease the components individually to establish a platform for meeting their computing needs. For instance, a word processing user may purchase a personal computer, an operating system, and a word processing application program. The user then typically installs the operating system on the computer and the word processor on the operating system. Similarly, a search service provider will purchase the hardware, such as two server computers, and will then install the software (e.g., the web server, the application server and the operating systems). Thereafter the provider will connect the hardware to the network, connect the network to the Internet, and then configure the software for communication according to a specific communication protocol (e.g., configure the web server to accept requests from clients and to obtain from the application server responses for the said request).

Traditional computing models include running a single application as a stand-alone application on a single computer as well as a "client-server" whereby a server computer on the Internet is used to transfer information to a client computer. Typically, the client computer is located at an end user's location, such as a personal computer in a user's home. This allows large amounts of information to be stored in, and accessed from, the server computer by many client computers. The client computers can access the server computer simultaneously. Another approach allows a user to obtain portions of executable programs from the server to operate an application program in functional "pieces" or components, on the client computer. For example, a user can run a word-processing program in a client-server mode where the server provides only those portions of the word-processing software to the user's computer on an as-needed basis.

Traditional computing models have the drawback of offering relatively limited choices. That is, users of today's computing services generally are required to choose to invest capital in specific computing devices while foregoing other types of devices. Consumers who engage in computing need to be knowledgeable of the underlying platform to ensure a purchased application software will operate correctly.

A few traditional models have attempted to provide computing as service. Although a timesharing model of early mainframe computers was employed to provide a pay-per-use pricing model, the pricing model failed to address other issues. For example, users are not presented with any choices as to how to modify or configure the associated computing environment or how to network additional resources, such as bandwidth or IP Addresses, with a conventional pay-per-use pricing scheme.

A well-known computing model referred as the "Application Service Provider" or ASP model eliminates the acquisition (and maintenance) of a computing infrastructure and introduces pay per use. This model removes the application from the end-user and might employ one or more servers. The ASP model allows a primary server to host a client-server application, or to host any type of data-processing resource such as a database, user interface, program component, data object, etc. The application can appear to the client as being hosted by the primary server when it is actually being provided by one or more other servers. The other servers can provide the application, or components, by having the client directly access the other server, or having the client access the other server through the primary server.

The drawback to this model, as well as other similar known models, includes an inherent inability to generalize and to scale for multiple applications and computing platforms. Another drawback of the ASP model is that it also eliminates user choices; one gets to choose the application, but not other components, such as hardware or network. This is a limitation for users which require high performance and high bandwidth as opposed to other users willing to forego either or both of these requirements for reduced costs. Yet another drawback with ASP models is that the applications are not easily customized for use in an ASP service. Still yet another drawback with ASP models is that often, ASP-ized applications are to be rewritten from scratch. So for new applications, and for in-house applications developed by organizations without core competence in ASP technology, the ASP model is not an effective solution. Still yet another drawback with ASP models is that the ASP model enables the use of the software but does not support programmability.

Thus, it is desirable to provide a system that improves upon the prior art.

SUMMARY OF THE INVENTION

The present invention enables computing to be provided as a packaged product or as a remote resource to users. Computing is delivered as a product or a resource by providing dynamic computing environments to users based on users' choices of virtual components (hardware, software or network components). A customer can choose the components and configure a computing environment. The system packages this environment and makes it available for users to compute. A service provider can use the system to create computing environments, automatically, on demand and thus providing computing as a remote resource to customers. The system monitors the usage of the customers and they are billed accordingly. In either case users can carry out their computing activity remotely using a client device such as a web browser.

In one embodiment the invention provides a system to provide computing as a resource to a user. The system includes a framework for providing a dynamic computing environment using allocable resources; and wherein the dynamic computing environment is used for computing by the user.

DETAILED DESCRIPTION OF A PREFERRED EMBODIMENT

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention enables computing resources and the activity of computing to be provided to a user as a packaged product as well as a service. A platform can be any combination of hardware and software components, or other resources. Examples of resources include memory space, processing cycles, network or bus bandwidth, IP addresses, timeslots, etc. Resources further include intangible assets such as the legal right (e.g., license) to use hardware or software. In general, a resource is any asset—including components, services, rights, obligations or other principle or effect—that enables computing.

According to an embodiment of the present invention, a customer can purchase or lease computing resources without acquiring hardware or software components and without managing the requisite infrastructure. The customer does not have to have specialized knowledge of the underlying components of the infrastructure.

This is achieved by a customer specifying a configuration of a computing environment for use, remotely if needed, using a suitable interface. Once specified, a system provides a platform that automatically create this environment dynamically to provide for computing of the present invention by allocating the requisite resources and make them available for the customer, which may limited to a specific requested time period.

According to the present invention, the resources for such a processing network are fully selectable and allocable by a system architect. In a specific embodiment, a primary company, Jareva Technologies, Inc.® provides proprietary technology to a system architect for designing a system by allocating resources and specifying how the resources are to be used. The system architect can be an individual, corporate entity, etc. The system is referred to as an "environment"—or more specifically as a "computing environment" and the primary provider of such an environment is referred to as an Environment Service Provider (ESP). A typical system architect is referred to as the "customer." The primary provider obtains revenue for providing the resources and the tools to easily select, allocate, configure and run the environment.

Dynamic computing environments and the process of creating them automatically are described in detail in related co-pending U.S. patent Ser. No. 09/663,252; filed Sep. 15, 2000, entitled "USER INTERFACE FOR DYNAMIC COMPUTING ENVIRONMENT USING ALLOCABLE RESOURCES." The interfaces for specifying the configuration of a computing environment and for (remote) access to a computing environment are described in detail in co-pending U.S. patent Ser. No. 09/662,990; filed Sep. 15, 2000, entitled "SYSTEM FOR CONFIGURATION OF DYNAMIC COMPUTING ENVIRONMENTS USING A VISUAL INTERFACE"

The present invention allows fast, efficient selection and configuration of processing networks, which can then be accessed and managed remotely. The processing network is referred to as a system including "resources." A system resource is any hardware, software or communication components in the system. For example, discrete hardware devices include processing platforms such as computers or processors, mobile/laptop computers, embedded computing devices, hand-held computers, personal digital assistants, point-of-sale terminals, smart-card devices, storage devices, data transmission and routing hardware etc., without limitation. Additionally, computer peripherals such as monitors, input/output devices, disk drives, manufacturing devices, or any device capable of responding to, handling, transferring or interacting with digital data are also resources. Software, or any other form of instruction, is executed by processors in the system and is also a type of resource. Finally, communication resources are also part of the system such as a digital network's hardware including the network's configuration and topology, where control of the network is provided by software and/or hardware. Additionally, the network may be based on wired connections or wireless connections. For instance, the network hardware and software may be based on Bluetooth wireless standards.

For example, a processing network of a general consumer might include a PDA and a cell phone, each connected by wireless channels to a single personal computer, which in turn is connected to an email server at a remote location through the Internet. As another example, a processing network might include a personal computer running Microsoft Windows 98 operating system, a lap-top computer running Linux operating system, and another personal computer running Windows NT operating system along with router and firewall software, wherein all three computers are connected using a local Ethernet hub, and the router software routes connections to the Internet.

The specific embodiment of the present invention allows fast allocation and configuration of resources such that different environments can be created from the same resources within minutes, or even seconds. This allows "time sharing" of overall resources so that a first environment can be "alive" or operative for a time period defined by the system architect (e.g., daily two-hour slot), followed by second, third and fourth environments being instantly created for the next four hours for three different customers, and so on. After a time period expires, such environments might either manually or automatically de-allocate such resources. Since these "computing environments" can be dynamically configured and re-configured out of the same set of resources, these will also be referred to as "Dynamic Computing Environments".

A specific embodiment allows customers to create a computing environment from a remotely-accessible user interface such as a web page on the Internet. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the present invention can, similarly, be located anywhere in the world such that labor costs are optimized.

The creation of dynamic computing environments ("DCE") is automatic. For example, a customer can request a web-site simulator using twelve web-page servers on a Microsoft® NT platform, two disk arrays at a specific bandwidth and storage capacity, two caching servers and 200 clients running Netscape Navigator™ under Microsoft Windows® 2000 using Pentium III™ processors at under 800 MHz. Such an environment is created and destroyed, and even re-created automatically, without human intervention each time. Unlike the conventional computing infrastructure, according to an embodiment of the present invention there is no need to physically couple or de-couple, each physical machine or resource to each other upon adding or removing such resources. There is no need to set-up Internet Protocol (IP) addresses or other network settings, or install operating systems and associated application programs on one or more physical machines. All such activities on a DCE can be performed automatically without user intervention.

According to the present invention, the DCE is a virtual computing system including a network comprising a number of distinct types of machines and a network connecting them. For example, a system architect might require a DCE to include a Sun Sparc running a certain version of Solaris O/S coupled to a Linux machine. The present invention enables the separation of the activity of designing a DCE, from the activity of actually creating the DCE. Designing a DCE includes choosing the specific hardware, choosing the operating systems or other software, and choosing the specific interconnections, etc. Creating a DCE includes allocating the resources, installing the operating systems and other software, etc. Furthermore, the present invention automates the process of creating the DCE. A DCE for which resources have not been allocated yet will also be referred to as a virtual computing environment. Similarly, a computing device (or a subnet) that is part of a DCE also be referred to as a virtual computing device (or a virtual subnet).

The present invention provides a framework that enables configuring, provisioning, accessing and managing DCEs remotely. Configuring a DCE involves choosing the resources and their interconnections. The present invention supports operations for making such design choices through appropriate programmable interfaces. The interfaces can be used interactively through a graphical user interface such as a web page or non-interactively through a program script. Provisioning a DCE involves allocation of physical resources required for a DCE to function. The present invention manages the physical resources needed for provisioning DCEs and supports operations for allocating/de-allocating these resources. Accessing a DCE involves accessing one or more devices and/or sub-networks within the DCE. The present invention supports operations for accessing the components of a DCE. For instance, when a user needs to copy data from a specific computer to a backup storage device, operations involving "read" access to the computer and its local storage, "write" access to the storage device, and access to the network for transmitting the data will be used by the present invention to meet the user's needs. Managing a DCE involves managing the components of a DCE, such as a personal computer, a network router, etc.

In one embodiment of the present invention, a system provide a framework for administering DCEs is implemented as a distributed system consisting of different software programs running on different computers and networking hardware. Administering DCEs, as described herein refers to the configuring, provisioning, accessing, and managing of dynamic computing environments. In a further embodiment, the present invention permits "virtual" hosting of dynamic computing environments. As used herein, the term "virtual" specifies that neither the requisite devices nor the network need to be physically accessible to users. Further, in accordance with this embodiment, the hosting process may be initiated or terminated by users at will, from any geographic location. Thus the administrative framework allows users to remotely configure, provision, access, and manage DCEs.

A further understanding of embodiments of the present invention will be gained with reference to the diagrams and the descriptions that follow.

Figure 1A:
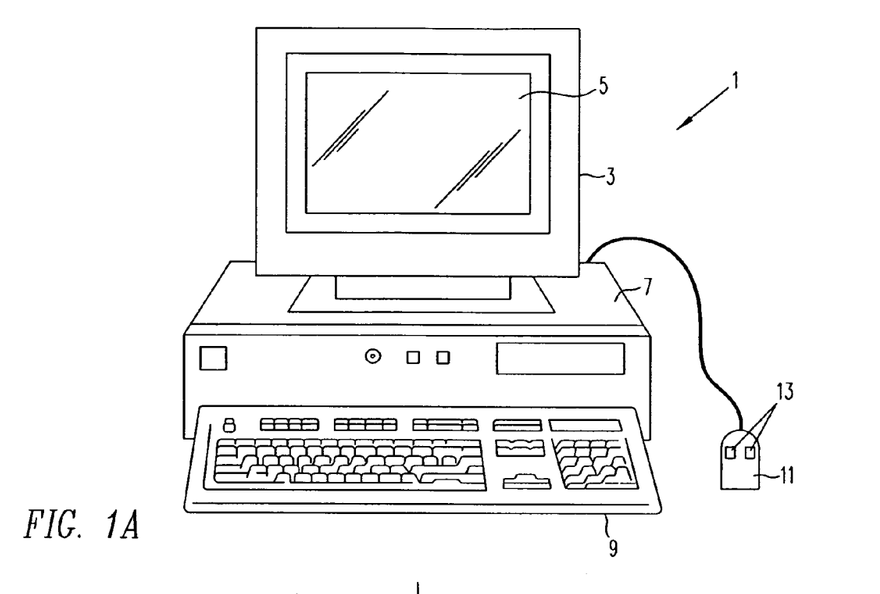
FIG. 1A is a first illustration of basic hardware components.
Figure 1B:
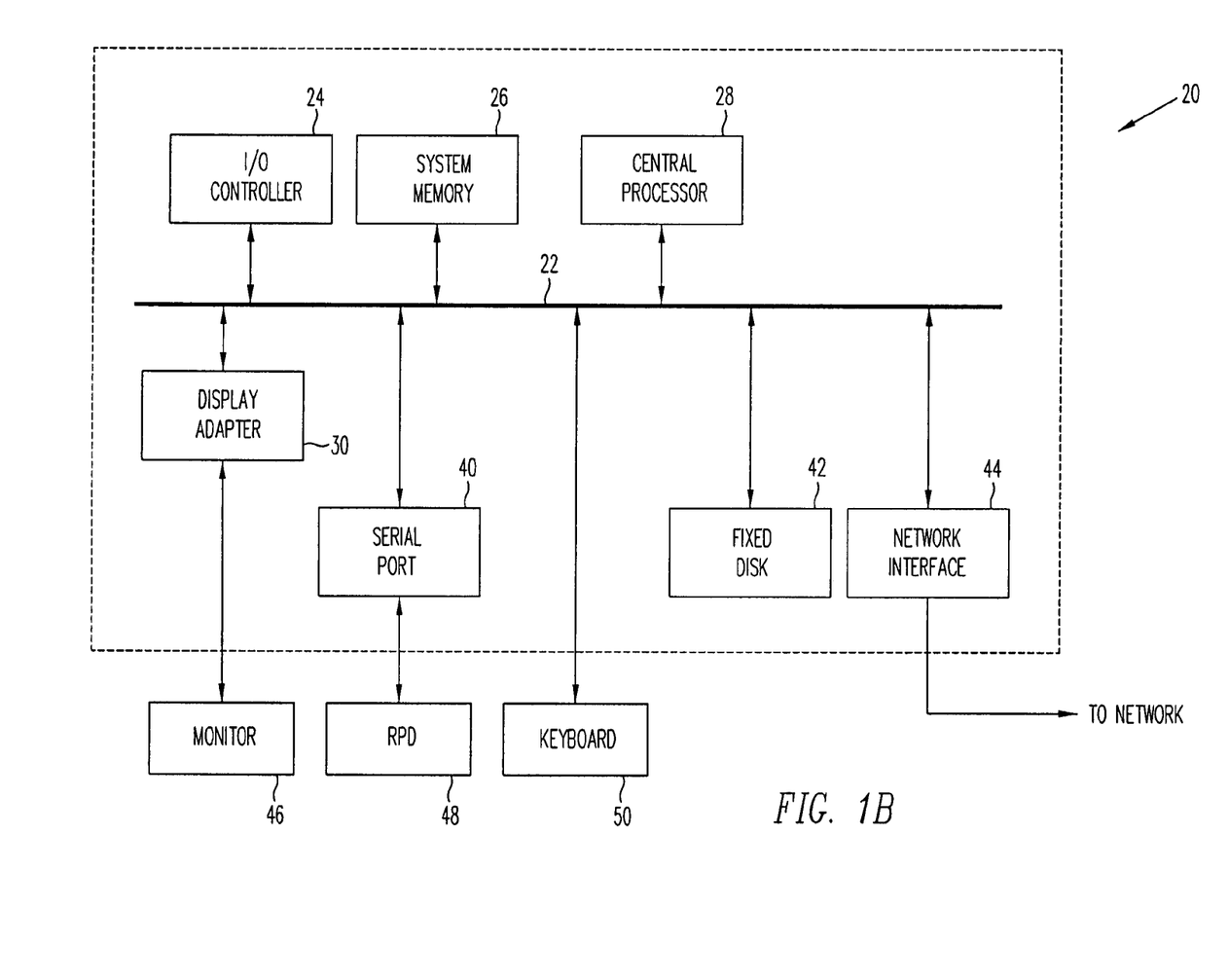
FIG. 1B is a second illustration of basic hardware components.
Figure 1C:
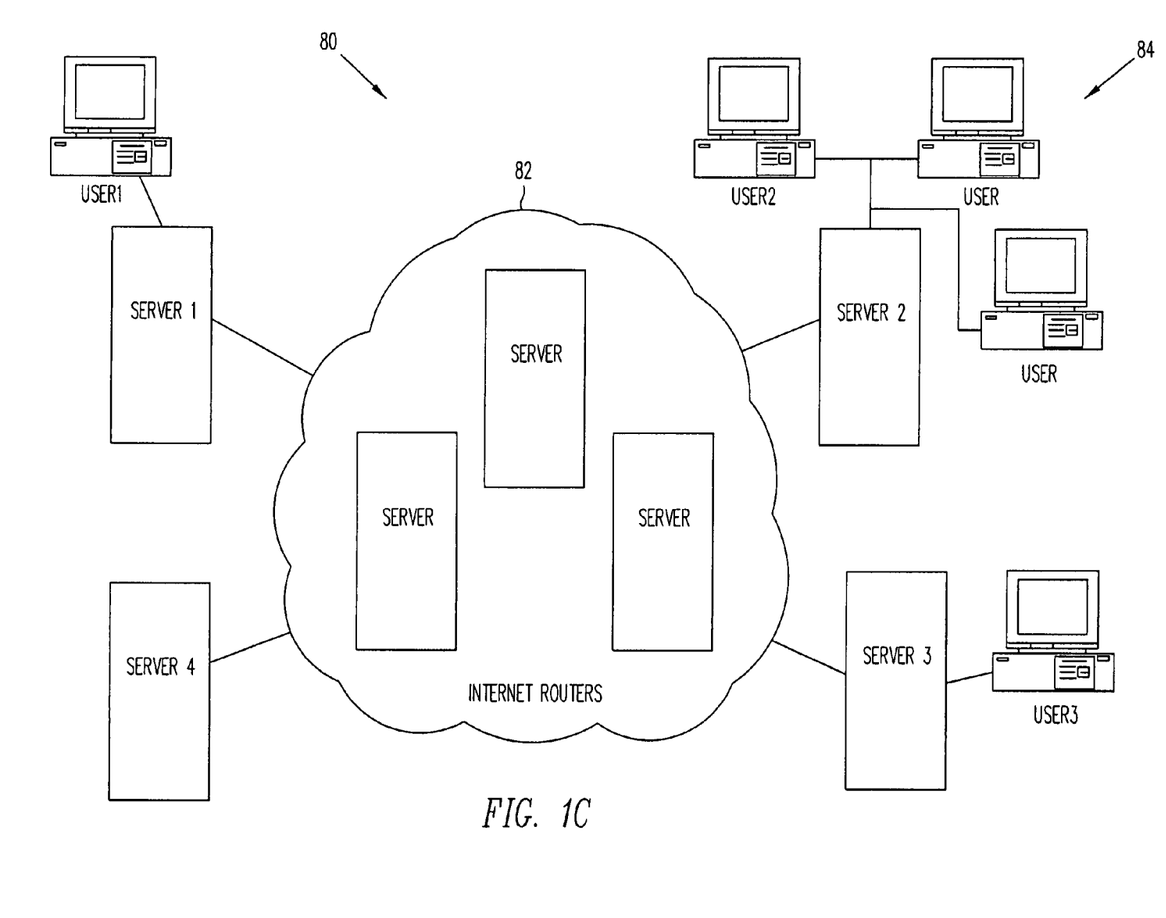
FIG. 1C is a third illustration of basic hardware components.

FIGS. 1A, 1B, and 1C illustrate basic hardware components suitable for practicing the present invention. FIG. 1A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44, which in turn is coupled electrically to a network. The use of bus 22 allows each of the subsystems to transfer data among subsystems and, most importantly, with the CPU, where the CPU might be a Sparc, an Intel CPU, a PowerPC, or the like. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system can be achieved without using all of the subsystems shown in FIG. 1B. For example, a standalone computer need not be coupled to a network so Network Interface 44 would not be required. Other subsystems such as a CDROM drive, graphics accelerator, etc. can be included in the configuration without affecting the nature or functionality of the system of the present invention.

FIG. 1C is a generalized diagram of a typical network that might be used to practice an embodiment of the present invention. In FIG. 1C, network system 80 includes several local networks coupled to the Internet. Although specific network protocols, physical layers, topologies, and other network properties are presented herein, the present invention is suitable for use with any network.

In FIG. 1C, computer USER1 is connected to Server1, wherein the connection can be by a network, such as Ethernet, or Asynchronous Transfer Mode, or by a modem, or by other means. The network provides the communication means, such as physical inter-connective links comprising copper wire, fiber optic cable, or the like, for transmitting and receiving signals. Wireless communication means, such as radio waves or the like, are also understood to provide means to transfer information from a source to a destination. Hence, the communication link need not be a wire but can be infrared, radio wave transmission, etc. Server1 is coupled to the Internet. The Internet is shown symbolically as a collection of server routers 82. Note that the use of the Internet for distribution or communication of information is not strictly necessary to practice the present invention but is merely used to illustrate a specific embodiment, below.

Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 line or T3 line. Similarly, other computers 84 are shown utilizing a local network at a different location from USER1 Computer. The computers at 84 are coupled to the Internet via Server2. USER3 and Server3 represent yet a third installation. In a specific embodiment, a user of the present invention operates a user interface associated with computers 84 to at least virtually configure one or more computing devices as a subnet. Note that the use of the term "computing device" includes any processing device or platform such as a web television device, personal digital assistant (e.g., a Palm Pilot manufactured by Palm, Inc.), cellular telephone, etc.

As is well known in the art of network communications, network is configured to communicate electrical information, such as a computer data signal comprising data (e.g., binary data bits) superimposed upon a radio or any other carrier wave. A person having ordinary skill in the are would appreciate that a carrier wave is electromagnetic energy propagated from a source by radiation, optical or conduction waves and is suitable for embodying an information-bearing signal, such as a computer data signal. In one embodiment, a carrier wave behaves, or is modulated, according to a network protocol, such as or Ethernet, IEEE 1394, TCP/IP, or any other communication protocol, so as to include computer data information. The carrier wave can be, for example, a direct current, an alternating current, or a pulse chain. In modulation of the carrier wave, it may be processed in such a way that its amplitude, frequency, or some other property varies so as to embody data for transfer.

Figure 2:
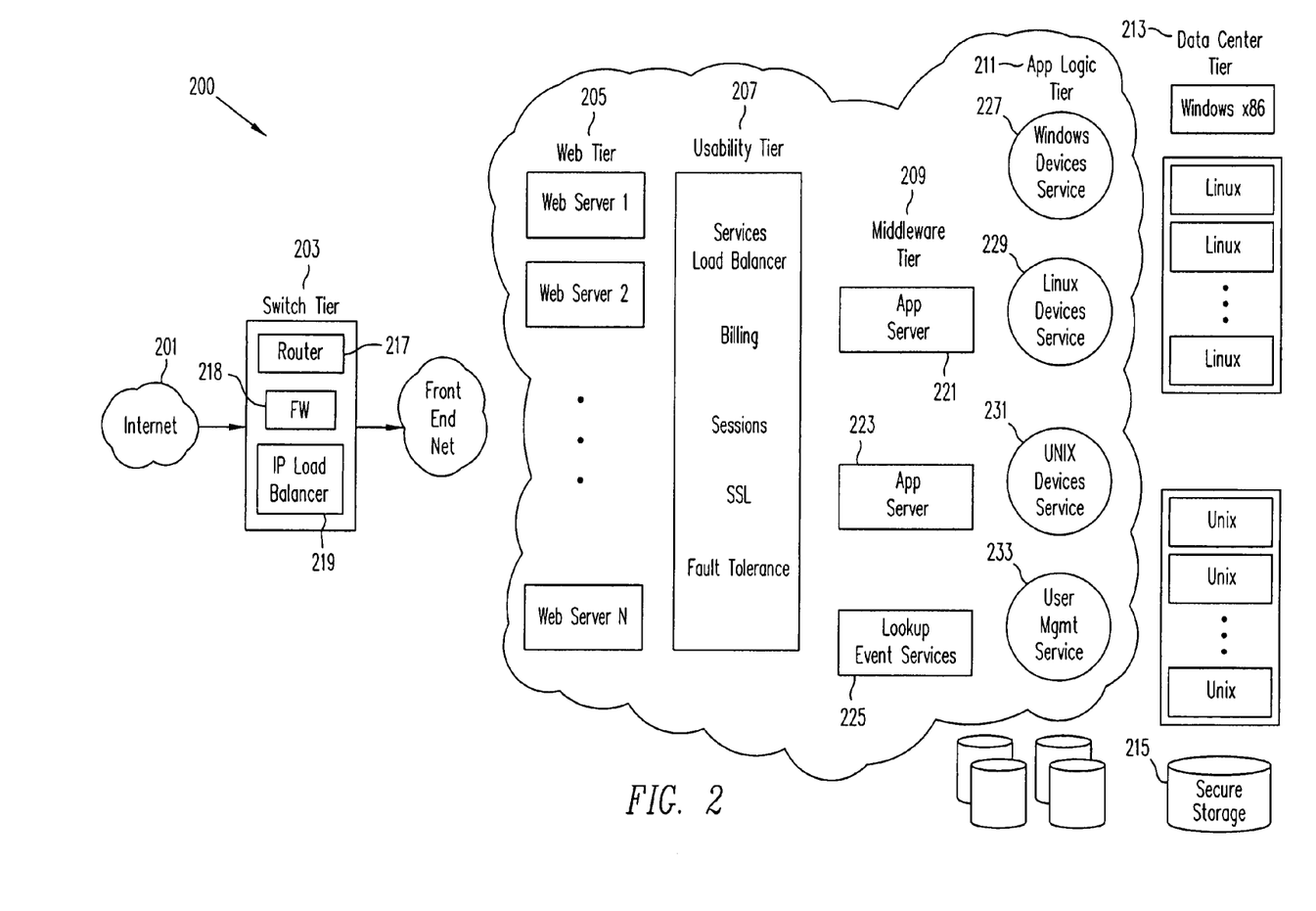
FIG. 2 is a block diagram illustrating an architecture of a system for hosting one or more DCE's.

FIG. 2 is a block diagram illustrating the N-Tier architectural structure of system 200 for hosting one or more DCEs according to the present invention. In FIG. 2, system 200 comprises a number of tiers, namely a switch tier 203, a web tier 205 usability tier 207, middleware tier 209, application logic tier 211 and data center tier 213. One or more of the tiers are implemented using software (proprietary or third-party), or hardware or a combination thereof. Switch tier 203 includes a router 217 for routing data packets through the network, a firewall 218 and a load balancer 219 for balancing the load on web tier 205. The load balancer 219 ensures that each of the web servers in the web tier 205 receives roughly equal amounts of load and if one of the web servers go down (i.e., becomes inoperable) the traffic is routed to other web servers in the web tier 205.

Exemplary load balancer 219 uses IP packets based load-balancing. Of course, one having ordinary skill in the art would appreciate that any other load balancing scheme may be used without affecting the nature of the switch tier 203 or any other tier. Router 217 may be a Cisco 7200 Series™ router available from Cisco, Inc.®, or alternatively, router 217 may be any other suitable type routers, or an equivalent device that provides substantially the same functionality. Web tier 205 comprises one or more web servers such as a Linux box running Apache web server, for example, or other comparable type web servers. Usability tier 207 provides various services including load balancing (for the app-servers), billing, session management, security (SSL), and fault tolerance. SSL refers to Secure Socket Layer, which is a protocol developed by Netscape for transmitting private documents via the Internet.

Middleware tier 209 contains one or more application servers 221, 223 and a module 225 for implementing look up event and services. The primary functionality of the middleware tier is to delegate requests to specific services that are responsible for specific actions. For instance, these actions may involve accessing the database, accessing the storage, or accessing a computing device. The processes running on the application servers 221 and 223 make such delegation decisions and are further illustrated in FIG. 3. BEA WebLogic™ servers running on a Solaris® platform, for example, or the like are suitable to implement application servers 221 and 223.

Since one or more of the services in the Application logic tier 211 may be replicated and be running on independent physical machines, they need to be "looked-up" for availability. Using such a lookup service will allow the services in the Application logic tier 211 to be started or shut down asynchronously. That is, the starting or shutting down the services related to logic tier 211 need not be synchronized with the processes on the application servers 221 and 223. For instance, increasing the number of Linux boxes—as capacity devices in Data Center tier 213—may require increasing the number of Linux device services, and this can be done without the knowledge of the application server(s) by automatically replicating the Linux device services and notifying the lookup service. In addition, the services in the Application logic tier 211 may have to notify events (such as a storage unit is full, or there are no more Linux boxes available) to the application servers 221 and 223. Such notification can be done through Lookup/Event services. Lookup/Event services can be provided through Sun Microsystems' Jini software layer, for example. Of course, other implementations of the lookup/event services using proprietary or third party software are possible.

Application logic tier 211 provides a variety of operating systems device services such as Windows 227, Linux 229, Unix 231 device services. These device services are responsible for managing physical devices available in the data center tier 213. User management service 233 is implemented within application logic tier 211 and establishes and maintains each user's configured virtual machines within a DCE. Such information is stored in the database associated with the application logic tier 211. Data center tier 213 includes various operating system platforms and processors, also selectable by the user. Data center tier 213 also includes networking and storage resources as well. Although not shown, one of ordinary skill in the art will realize that one or more of the aforementioned tiers and components therein can be implemented using third party providers, dedicated custom modules or software and hardware or a combination thereof.

Figure 3:
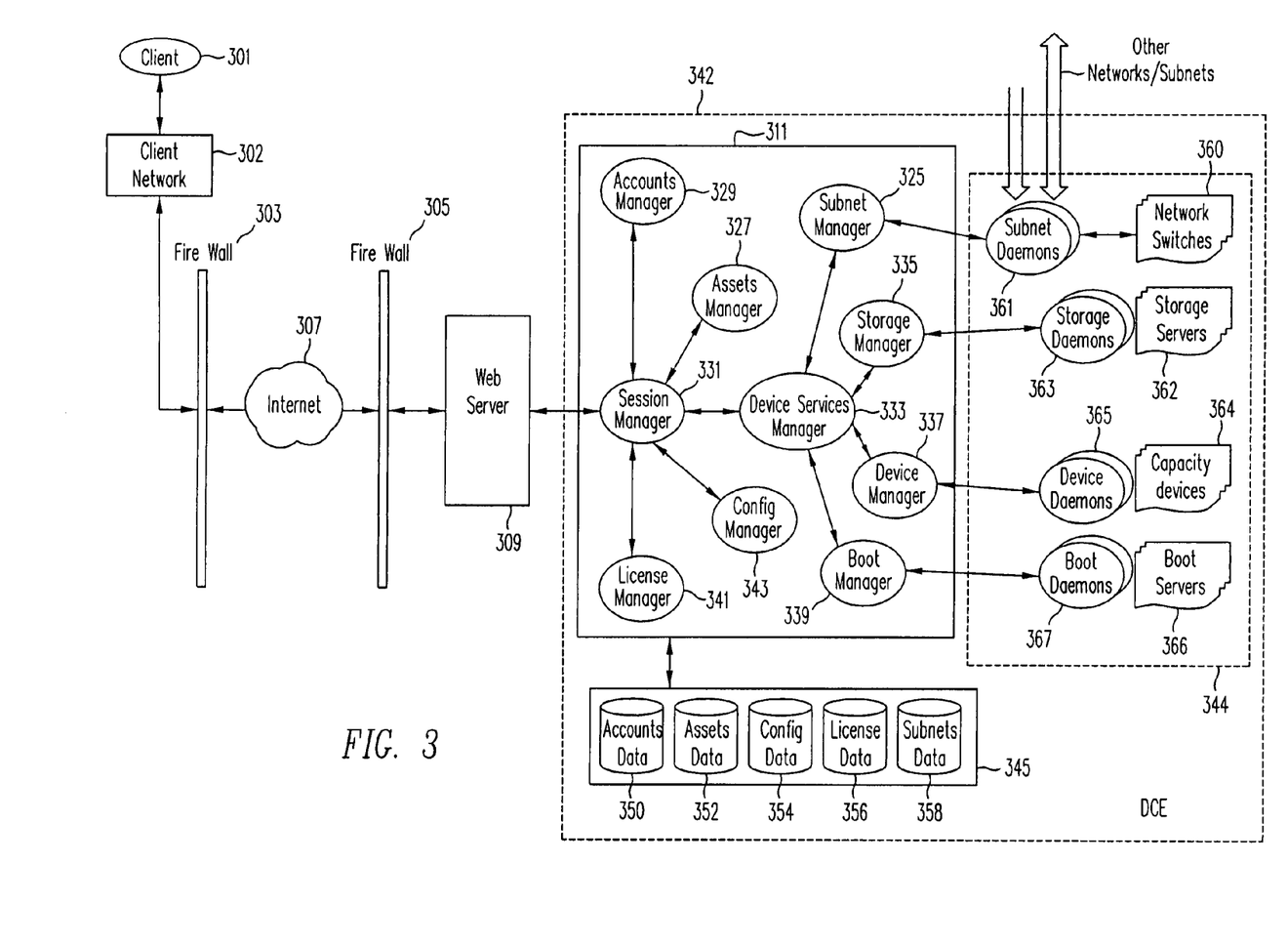
FIG. 3 illustrates resources used in a computing environment.

The framework 342 shown in FIG. 3 illustrates the typical resources required for a computing environment (such as Capacity devices or CPUs, Storage servers, and Network switches, Licenses), and the infrastructures required for automatically creating a computing environment (such as the application server 311 and its components, the database 345 and its tables). This framework can accept specifications of a computing environment (i.e., how is it to be configured), can create an environment automatically by allocating resources, can enable customer access to the created environment, and can enable management of the environment for continued use. Furthermore this framework allows multiple Dynamic Computing Environments to be created concurrently out of a resource pool.

In one embodiment of the present invention a system using the framework 342 is implemented for providing users with computing as a product. More specifically, in this embodiment a customer can choose specific components required for computing and the system will package the components to provide an environment that can be used for computing by the customer. For instance, the email customer may specify the preferred email software. The system will choose a compatible operating system, a compatible client device running the operating system and the email software, acquire licenses, network connections etc.; the system will then package these resource to provide an email client product to the customer. The customer pays for the product as a whole not separately for the hardware, software, or for the network connection. Also, the customer need not maintain any of the components and need only learn to access the email system as a whole.

In a further embodiment of the present invention a system using the framework 342 is implemented for providing users with computing a resource. More specifically, in this embodiment a service provider can configure the components required for computing and the system will provide an environment that can be used by one or more customers concurrently. A computing service provider can specify the components of a computing environment and request that multiple copies of the environment be created. The system will create the environments, will allow concurrent access to the environments by different customers, will meter usage for each customer (say in terms of CPU time, storage used, network bandwidth used etc.), will guarantee the quality of service for each customer by monitoring the resources. The customers have secure and isolated access to the environments i.e., first customer's environment and data are not accessible to the second customer and first customer's actions on the first environment will not affect the environment of the second customer. Also, customers are allowed to pay per use i.e. each customer pays for the environment they use and for the time they use the environment rather than purchasing the environment or the components out right.

A further understanding of embodiments of the present invention will be gained with reference to the diagrams and the descriptions that follow.

Figure 4:
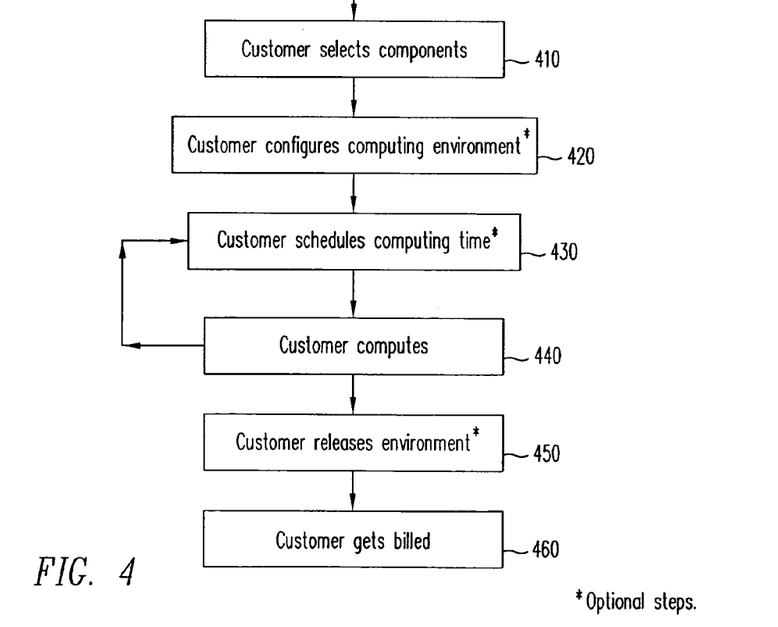
FIG. 4 is a flow chart illustrating the steps for a user to purchase computing as a packaged product.

FIG. 4 illustrates the steps taken by a customer in the process of purchasing computing as a product according to one embodiment of the present invention. In step 410, a customer selects the desired components if needed. Components are presented virtually to customers. Thus customers are only specifying selections. The system presents provides an abstraction for each component such as CPU, storage, OS, applications software, network switches, network bandwidth. Each abstraction may have a set of properties and compatibility constraints associated with it. For instance, Linux operating system software may run only on Intel x86-compatible CPUs; or that Apache web server software may run only under Windows NT/2000 or Linux operating systems; or that a certain switch has 64 ports which limits the number of computers connected to the network controlled by the switch to at most 64.

Once the customer has selected the components the computing environment can be configured in step 420. For instance, the user may specify that the Apache web server software has to run on Linux web servers; or that the web servers and application server(s) must be connected to the same network; or that two different networks must be connected to each other by a high bandwidth connection; or that a network must have a gateway to the Internet. Step 420 is optional because the system may present abstractions for pre-configured components. Each customer can save the environment configured as a new abstraction. This allows the system to present the new abstraction as a pre-configured component. For instance, a configuration of an Intel x86-compatible computer running a Windows 98 operating system and a WordPerfect word processing system may be presented as an "Easy Word Processing" component. If this configuration meets a customer's requirements then the customer need not do any further work. Of course, the customer may pick a pre-configured component and use it as part of another environment. This method of configuring, saving and presenting environment configurations saves time and effort for customers as well as providers. Environment can be used again and again without going through the configuration step. Commonly used environment configurations can be provided by service providers and used by large numbers of customers.

In step 430 a customer may schedule a period of time for computing. This allows for the system to reserve the required resources and provide a guarantee to the customer on availability. In step 440 a customer "computes" i.e., uses the environment or programs the environment. The customer can repeat steps 430 and 440 as often as needed with the same environment. Eventually the customer may release the environment unless the customer opts to buy the environments or for a perpetually renewable license. Then the customer gets billed for the environment over the period of usage.

The flow chart in FIG. 4 is but one possible embodiment of a sequence a user can go through to purchase computing. For instance, there may be different billing options such as per-use billing, periodic billing, billing in installments, or a combination thereof. Also, the user may choose multiple environments and use them concurrently, or at different scheduled times. For instance, a web site for selling office equipment may choose an environment with large computing power and high bandwidth during office hours and a cheaper environment with limited computing power and bandwidth during off hours to optimize their costs versus response time to their customers in turn.

Figure 5:
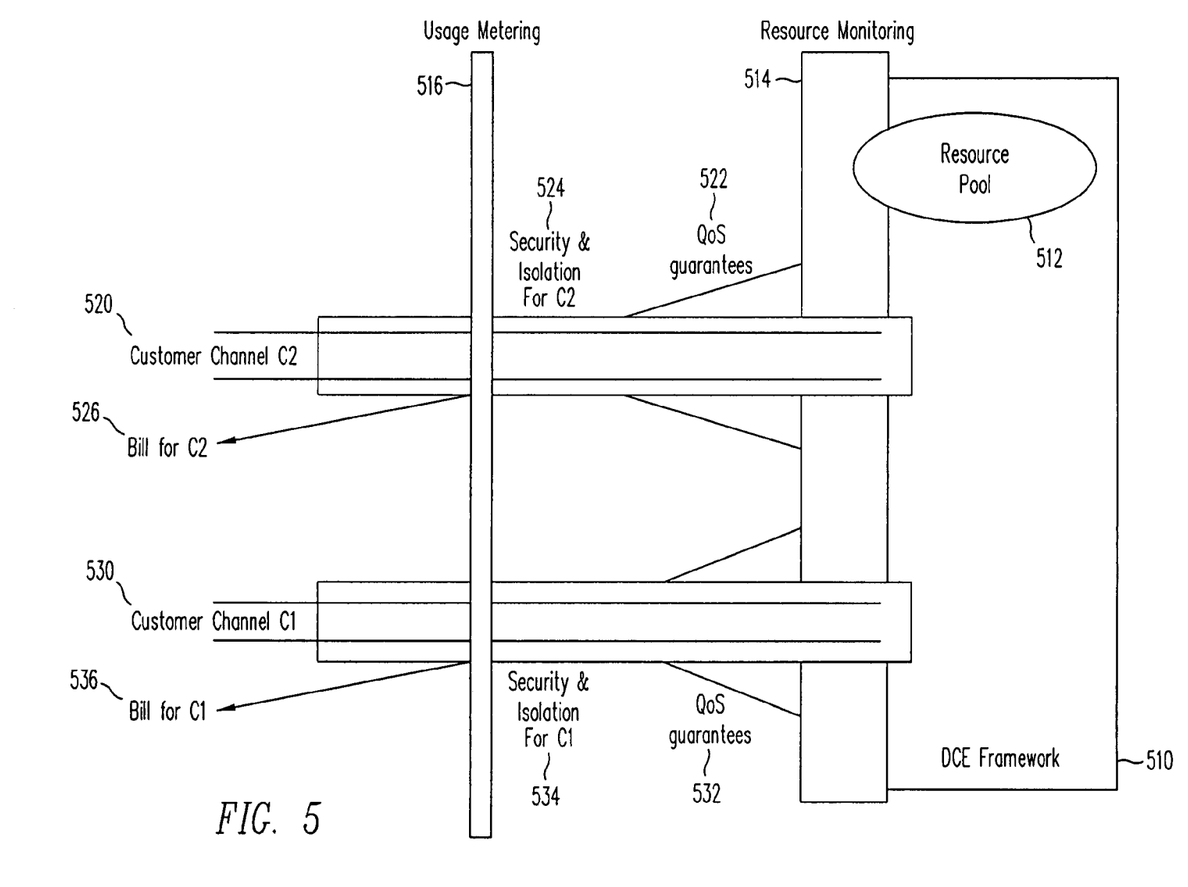
FIG. 5 is a block diagram of a platform for providing computing as a remote resource.

A further embodiment of the present invention is a system to provide computing as a resource that can be accessed remotely. In this embodiment customer usage can be metered and customers can be billed per usage. Multiple customers can access their resources concurrently and each user gets secure access to their resource and is provided with a Quality of Service guarantee. FIG. 5 illustrates a block diagram of a platform for this embodiment based on a system for providing Dynamic Computing Environments illustrated in FIGS. 2 and 3.

DCE Framework 510 in FIG. 5 is the same as the framework 342 in FIG. 3. The Resource pool 512 includes all the resources such as capacity devices (i.e., CPUs), storage servers, network switches, licenses etc. Customer channel C1 (530) is a connection from a single customer to the framework 510. This channel enables the customer to create a dynamic computing environment and use it i.e., it is a computing channel. Customer channel C2 (520) is a computing channel for concurrent usage by a second customer. Security and isolation for each channel (522, 532) is supported by this platform. Resource monitoring (514) tools are used to monitor the individual resources being used from the resource pool and ensure their quality. For instance, tools may be provided to ensure high CPU utilization in each capacity device, or to ensure quick recovery from network failures. These tools eventually ensure that the service meets the QoS guarantees (524, 534) provided for each customer channel. Metering system 516 measures or meters the usage for each channel. Measurements include CPU usage, amount of storage, network bandwidth, IP Addresses, software licenses among others. Usage measurements coupled with period of usage for a channel will be used to bill each customer channel (526, 536).

Support for resource monitoring is available in framework 510 (alias framework 342 in FIG. 3) through daemons (such as 361, 363, and 365 in FIG. 3). Furthermore the Fault Tolerance and Load Balancer components of the usability tier 207 are also helpful in providing Quality of Service guarantees (524, 534).

Support for security and isolation is available through the Sessions and SSL components of the usability tier 207 in FIG. 2.

Support for usage monitoring is available through the managers in application server 311 in FIG. 3. For instance, configuration manager 343 keeps track of configurations saved by customers. So usage for a configuration can then be measured by usage of the components of the configuration. For example, the usage for the "Easy Word Processing" configuration described above would include the device utilization for an x86-compatible computer, the license usage for Windows 98 operating system and the license usage for WordPerfect software. Similarly, the storage manager keeps track of the amount of storage used per customer. Conversion of the usage costs to bill prices is supported by the Billing component of usability tier 207 in FIG. 2.

Thus the platform illustrated in FIG. 5 provides computing as a remote, pay-per-use resource that is scalable and secure.

Although the present invention has been discussed with respect to specific embodiments, one of ordinary skill in the art will realize that these embodiments are merely illustrative, and not restrictive, of the invention. The scope of the invention is to be determined solely by the appended claims.

What is claimed is:

1. A method comprising:
   receiving user input selecting an abstraction for inclusion in a dynamic computing environment, wherein
       the abstraction corresponds to one or more components, and
       the abstraction has a corresponding constraint;
   allocating the one or more components corresponding to the abstraction to the dynamic computing environment, wherein
       the one or more components comprise one or more hardware components, and
       the one or more hardware components comprises a processor that satisfies the corresponding constraint; and
   providing a customer channel to the dynamic computing environment, wherein
       the customer channel is provided over a network comprising a first router, and
       the customer channel is configured to provide a user with access to use the dynamic computing environment for computing.

2. The method of claim 1, wherein
   the dynamic computing environment comprises one or more of: a software component, a hardware component, and a network component;
   the software component comprises one or more of: an operating system and an application;
   the hardware component comprises one or more of: a computing device and a storage device; and
   the network component comprises one or more of: a second router, a switch, a gateway, and a network security element.

3. The method of claim 2, wherein
the abstraction corresponds to a plurality of components, and
the plurality of components define a pre-configured computing environment component.

4. The method of claim 3, further comprising:
allocating a plurality of sets of the components to provide a plurality of instances of the dynamic computing environment, wherein
 each of the sets of the components is allocated as a different one of the instances of the dynamic computing environment; and
providing a plurality of customer channels, wherein
 each of the customer channels is configured to provide access to a respective one of the instances of the dynamic computing environment, and
 the customer channels provide concurrent access to the instances of the dynamic computing environment.

5. The method of claim 4, wherein
the user input is received from a service provider,
each of the customer channels provides a separate one of a plurality of users with access to a separate one of the instances of the dynamic computing environment, and
the customer channels prevent one of the users from accessing an instance of the dynamic computing environment that is being accessed by another one of the users.

6. The method of claim 2, further comprising:
receiving additional user input selecting one or more additional abstractions, wherein each of the one or more additional abstractions corresponds to one or more additional components; and
allocating the one or more additional components corresponding to each of the one or more additional abstractions to the dynamic computing environment.

7. The method of claim 2, further comprising:
receiving user input specifying a configuration for the abstraction, wherein
 the configuration identifies at least one of: an interconnection between the one or more components and one or more requirements for the one or more components.

8. The method of claim 2, further comprising:
receiving user input scheduling a period of time for customer usage of the dynamic computing environment.

9. The method of claim 2, further comprising:
monitoring the one or more components to ensure that a quality of service guarantee is being met by the dynamic computing environment.

10. The method of claim 2, further comprising:
measuring the usage of the customer channel; and
generating a bill for usage of the dynamic computing environment, based on the measuring.

11. A system comprising:
a framework configured to receive user input selecting an abstraction for inclusion in a dynamic computing environment, wherein
 the abstraction correspond to one or more components,
 the abstraction has a corresponding constraint, and
 the framework is configured to allocate the one or more components to the dynamic computing environment, wherein
  the one or more components comprise one or more hardware components, and
  the one or more hardware components comprises a processor that satisfies the corresponding constraint;
a resource pool coupled to the framework and comprising the one or more components; and
a customer channel coupled to the resource pool and the framework, wherein
 the customer channel is provided over a network comprising a first router, and
 the customer channel provides a user with access to use the dynamic computing environment for computing.

12. The system of claim 11, wherein
the dynamic computing environment comprises one or more of: a software component, a hardware component, and a network component;
the software component comprises one or more of: an operating system and an application;
the hardware component comprises one or more of: a computing device and a storage device; and
the network component comprises one or more of: a second router, a switch, a gateway, and a network security element.

13. The system of claim 12, wherein
the abstraction corresponds to a plurality of components, and
the plurality of components define a pre-configured computing environment component.

14. The system of claim 13, wherein
the framework is configured to allocate a plurality of sets of the components to provide a plurality of instances of the dynamic computing environment,
 each of the sets of the components is allocated as a different one of the instances of the dynamic computing environment; and
the system further comprises a plurality of customer channels, wherein
 each of the customer channels provides access to a respective one of the instances of the dynamic computing environment, and
 the customer channels provide concurrent access to the instances of the dynamic computing environment.

15. The system of claim 14, wherein
the user input is received from a service provider,
each of the customer channels provides a separate one of a plurality of users with access to a separate one of the instances of the dynamic computing environment, and
the customer channels prevent one of the users from accessing an instance of the dynamic computing environment that is being accessed by another one of the users.

16. The system of claim 12, wherein
the framework is configured to receive additional user input selecting one or more additional abstractions,
each of the one or more additional abstractions corresponds to one or more additional components; and
the framework is configured to allocate the one or more additional components corresponding to each of the one or more additional abstractions as part of the dynamic computing environment.

17. The system of claim 12, wherein
the framework is configured to receive user input specifying a configuration for the abstraction,
the configuration identifies at least one of: an interconnection between the one or more components and one or more requirements for the one or more components, and
the framework is configured to provide the configuration within the dynamic computing environment.

18. The system of claim 12, wherein
the framework is configured to receive user input scheduling a period of time for usage of the dynamic computing environment, and
the framework is configured to provide access to the dynamic computing environment during the period of time.

19. The system of claim 12, wherein the framework comprises:
a resource monitoring system configured to monitor the one or more components to ensure that a quality of service guarantee is being met by the dynamic computing environment.

20. The system of claim 12, wherein the framework comprises:
a metering system configured to measure the usage for the customer channel and to generate a bill for usage of the dynamic computing environment, based on the measured usage.

21. A system comprising:
means for receiving user input selecting an abstraction for inclusion in a dynamic computing environment, wherein
the abstraction corresponds to one or more components, and
the abstraction has a corresponding constraint;
means for allocating the one or more components corresponding to the abstraction to the dynamic computing environment, wherein
the one or more components comprise one or more hardware components, and
the one or more hardware components comprises a processor that satisfies the constraint; and
means for providing a customer channel to the dynamic computing environment, wherein
the customer channel is provided over a network comprising a first router, and
the customer channel is configured to provide a user with access to use the dynamic computing environment for computing.

22. The system of claim 21, wherein
the dynamic computing environment comprises one or more of: a software component, a hardware component, and a network component;
the software component comprises one or more of: an operating system and an application;
the hardware component comprises one or more of: a computing device and a storage device; and
the network component comprises one or more of: a second router, a switch, a gateway, and a network security element.

23. A computer readable medium comprising program instructions executable to:
receive user input selecting an abstraction for inclusion in a dynamic computing environment, wherein
the abstraction corresponds to one or more components, and
the abstraction has a corresponding constraint;
allocate of the one or more components corresponding to the abstraction as part of the dynamic computing environment, wherein
the one or more components comprise one or more hardware components, and
the one or more hardware components comprises a processor that satisfies the corresponding constraint; and
provide a customer channel to the dynamic computing environment, wherein
the customer channel is provided over a network comprising a first router, and
the customer channel is configured to provide a user with access to use the dynamic computing environment for computing.

24. The computer readable medium of claim 23, wherein
the dynamic computing environment comprises one or more of: a software component, a hardware component, and a network component;
the software component comprises one or more of: an operating system and an application;
the hardware component comprises one or more of: a computing device and a storage device; and
the network component comprises one or more of: a second router, a switch, a gateway, and a network security element.

\* \* \* \* \*